US005504785A

United States Patent [19]
Becker et al.

[11] Patent Number: 5,504,785
[45] Date of Patent: Apr. 2, 1996

[54] DIGITAL RECEIVER FOR VARIABLE SYMBOL RATE COMMUNICATIONS

[75] Inventors: Donald W. Becker, Encinitas; Fred Harris, Lemon Grove; James C. Tiernan, Solana Beach, all of Calif.

[73] Assignees: TV/COM Technologies, Inc., San Diego; Hyundai Electronics America, Milpitas, both of Calif.

[21] Appl. No.: 68,560

[22] Filed: May 28, 1993

[51] Int. Cl.$^6$ .............................. H04L 27/06; H04B 1/10
[52] U.S. Cl. .......................... 375/344; 375/350; 375/364; 375/269
[58] Field of Search .................................. 375/344, 235, 375/269, 350, 355, 376, 362, 377, 364

[56] References Cited

U.S. PATENT DOCUMENTS

| | | | |
|---|---|---|---|
| 3,978,407 | 8/1976 | Forney, Jr. et al. | 375/15 |
| 4,004,226 | 1/1977 | Qureshi et al. | 375/15 |
| 4,253,186 | 2/1981 | Godard | 375/15 |
| 4,262,360 | 4/1981 | Bigo et al. | 375/15 |
| 4,320,517 | 3/1982 | Godard et al. | 375/355 |
| 4,599,732 | 7/1986 | LeFever | 375/355 |
| 4,733,403 | 3/1988 | Simone | 375/350 |
| 4,815,103 | 3/1989 | Cupo et al. | 375/355 |
| 5,255,289 | 10/1993 | Tomita | 375/355 |

FOREIGN PATENT DOCUMENTS

| | | | |
|---|---|---|---|
| 83302140 | 4/1983 | European Pat. Off. | H04L 7/02 |
| 85305841 | 8/1985 | European Pat. Off. | H04L 7/02 |
| 0282298 | 9/1988 | European Pat. Off. | H03M 13/00 |
| 91104616 | 3/1991 | European Pat. Off. | H04L 7/033 |
| 0490552 | 6/1992 | European Pat. Off. | H04L 27/34 |

OTHER PUBLICATIONS

Floyd M. Gardner, "Interpolation in Digital Modems—Part I: Fundamentals", IEEE Transactions on Communications, No. 3, Mar., 1993.
fred harris, "On the Relationship Between Multirate Polyphase FIR Filters and Windowed, Overlapped, FFT Processing," Twenty–Third Asilomar Conference on Signals, Systems, and Computers, Oct. 30–Nov. 1, 1989.
fred harris et al., "Modified Polyphase Filter Structure for Computing Interpolated Data As Successive Differential Corrections," 1991 International Symposium on Circuits and Systems, Singapore, 11–14 Jun. 1991.
fred harris, "Design Considerations and Design Tricks for Digital Receivers," 9th Kobe International Symposium on electronics and Information Sciences, Kobe, Japan, Jun. 18–19, 1991.
J. J. Poklemba et al., "A digitally implemented modem: Theory and emulation results," *Comsat Technical Review*, vol. 22, No. 1, Spring 1992 (pp. 149–195).

(List continued on next page.)

*Primary Examiner*—Edward L. Coles, Sr.
*Assistant Examiner*—Madeleine Anh-Vinh Nguyen
*Attorney, Agent, or Firm*—Baker, Maxham, Jester & Meador

[57] ABSTRACT

A digital receiver includes a tuner and a demodulator that obtains the baseband signal carried in a received analog signal. A first sampler operates at a preselected fixed sampling rate asynchronous with the baseband component to produce a first sampler output. A controllable digital filter resamples the first sampler output to produce a filter output with a selectable resampling rate. The resampled output is time-position locked to the baseband signal epochs. The second sampling is processed to ascertain the symbol bit stream of the baseband signal. The controllable filter sampling rate is automatically varied to correspond to the symbol rate of the baseband signal, so that the sampling rate of the first sampler need not change. Initial signal acquisition is achieved by operating the receiver as a frequency spectrum analyzer. A single signal-carrying band is identified and demodulated, and a menu carried on a transport layer is read. This menu provides the center frequencies and bandwidths For all of the signals within an available frequency range, so that the receiver can be reconfigured for any desired signal. Changes in transmission characteristics of the signal can later be accommodated seamlessly by reading a change notice transmitted in the transport layer and reconfiguring the receiver for the new transmission characteristics.

12 Claims, 4 Drawing Sheets

OTHER PUBLICATIONS

Graychip, Inc., product brochure on GC1012 Digital Tuner Chip, Mar. 13, 1992. (2 pages).

G. Mitchell, "Multirate filters alter sampling rates even after you've captured the data," *EDN*, Aug. 20, 1992, pp. 129–140.

fred harris, "Digital T/2 Nyquist Filtering Using Recursive All–Pass Two–Stage Resampling Filters for a Wide Range of Selectable Signalling Rates," Twenty–sixth Asilomar Conference on Signals, Systems & Computers, Pacific Grove, CA, 26–28 Oct. 1992.

D. Chester et al., "Single Chip Digital Down Converter Simplifies RF DSP Applications," *RF Design*, Nov. 1992, pp. 39–46.

Tera Research Corp., product brochure on DT–102 Dual Channel Digital Tuner, 1992. (2 pages).

Harris Semiconductor, product brochure on HSP50016 Digital Down Converter. 1992. (1 page).

Mike Petrowski et al., "Single Chip Digital Down Converter Architecture". (4 pages).

William Rinard et al., "Implementation of a Programmable Digital Receiver Multi–Chip Module." (3 pages).

Seung–Eok Hong et al., "Implementation of an All–Digital DS–CDMA Receiver–Chip Synchronization for an Orthogonally Coded Cellular CDMA System." (5 pages).

TRW product brochure on "DR01VLSI CMOS Digital Receiver" (2 pages).

Raytheon Corporation, Typical End–Product Block Diagram of "DBS Receiver Unit." (1 page).

Raytheon Corporation, Typical End–Product Block Diagram of "Digital Cellular Telephone Transceiver". (1 page).

DIGITAL RECEIVER FOR VARIABLE SYMBOL RATE COMMUNICATIONS

BACKGROUND OF THE INVENTION

This invention relates to the reception and demodulation of communications signals, and more particularly, to the reception of such signals transmitted with selectable symbol rates.

In a communications system, symbols (also sometimes called "data") is formatted onto a carrier signal and transmitted by a transmitter. After the signal travels through some intervening medium, it is received and decoded by the receiver. Ideally, the waveform of the symbols would remain unchanged during the communications process. In practice, however, the waveform is distorted and corrupted by its passage both through the electronic circuitry of the transmitter and the receiver, and through the medium. An important feature of the receiver is the processing of the received signal to determine the actual content of the symbol stream even though the transmitting signal has become distorted and corrupted during the transmission and reception process.

For example, in a typical satellite communications system a symbol stream is created at one location on the earth, encoded onto a radio signal, and transmitted to a satellite in synchronous orbit above the earth. The satellite retransmits the received signal to another location on the earth, where it is received and demodulated. The data-carrying symbol stream passes through several electronic systems, thousands of miles of free space, and twice through the atmosphere, and in all of these portions of the transmission it is subject to external interference and distortions.

Historically, the signal has been transmitted and processed entirely by analog techniques. More recently, digital signal processing techniques are being adopted because they permit more precise determination of the data content of the signal. In digital signal processing, the receiver has a conventional tuner that receives and down converts the signal. The receiver thereafter samples the received analog signal to form a digital pulse train or signal. The digitized signal is further processed to extract the data content of the symbol stream.

This known approach works well for the condition that the transmitted signal has a fixed symbol rate known to the receiver, which permits the receiver to be configured for the characteristics of the known transmitted signal. In other instances, however, it is desirable to vary the symbol rate of the transmitter in an arbitrary manner. For example, a single satellite channel may be used to carry many different types of data signals, some of which are transmitted at a high symbol rate and some of which are transmitted at a low symbol rate. In another example, if the satellite channel carries a digitized video signal, it may be desirable to vary the symbol rate depending upon the type of programming being carried. A video feed of a conference could be transmitted at a lower symbol rate than a video feed of a sports event, for example, due to the differences in the speed of the action. The lower the symbol rate of the signal, the more different types of data that could be carried by a single satellite channel. The ability to carry larger amounts of data with fixed satellite channel capability becomes increasingly important as more video programs and other information are available for transmission.

Several problems arise in complex communications systems having multiple channels, where the symbol rate is variable in each channel. As the symbol rate of the signal in a channel changes, the sampling rate of the sampler in the receiver must change in order to satisfy the Nyquist sampling criterion. The sampler is normally synchronized to a clock signal, which changes to permit the sampler to be varied to an arbitrary sampling rate. However, for other reasons it is strongly preferred not to change the clock rate in an arbitrary fashion so as to accommodate changes in the symbol rate. A second problem is that it is difficult to achieve initial acquisition of the signal of the received information, when the channel is first activated, and to follow changes in the transmission parameters as they are made during transmissions, unless these parameters are otherwise made known to the receiver.

There is a need for a digital receiver system that is operable at controllably variable rates, particularly in a multichannel communications system. The present invention fulfills this need, and further provides related advantages.

SUMMARY OF THE INVENTION

The present invention provides a digital receiver that accommodates variable symbol rates in digital signal processing while performing primary sampling at a fixed clock rate. The digital receiver automatically achieves initial acquisition of the baseband signal and remains locked to the symbol rate frequency of the signal through changes in the transmission parameters of the baseband signal and the symbol stream. The receiver supports time multiplexing, frequency multiplexing, and a combination of the two multiplexing approaches.

In accordance with the invention, a digital receiver is operable an analog signal wherein a symbol rate of the analog signal can be varied over a range. The digital receiver comprises a tuner having the transmitted analog signal as an input and a received analog signal as an output and a demodulator having a first input of the received analog signal and a second input of an internally generated local oscillator ("mixer") waveform, and an output of a baseband signal modulated on the received analog signal. The heterodyned baseband signal is provided to a low pass (or a band pass) analog filter that acts as an anti-aliasing filter. A first sample r samples the output of the low pass (or band pass) filter baseband signal at a preselected fixed asynchronous (relative to the symbol rate) sampling rate. A controllable digital filter resamples the first sampler output at a controllable rate, and is further controlled to achieve a time-position lock to the baseband signal epochs. A matched filter produces a spectrally shaped symbol bit stream from the output of the controllable digital filter, and also produces a phase position error signal for the symbol bit stream. A timing loop utilizes the timing error signal to control the time position lock of the controllable digital filter. In one approach, a single polyphase filter, which may be a multirate (rational) or a variable rate (continuous) digital filter, performs the functions of the controllable digital filter, the matched filter, and the timing loop.

The invention also extends to the mode of operation of the digital receiver. In accordance with this aspect of the invention, a method for receiving transmitted analog signals, wherein a symbol rate of the analog signal can be varied over a range, comprises the steps of receiving the transmitted analog signal with an analog tuner that produces a received analog signal and extracting a baseband signal from the received analog signal. Those components of the baseband signal having a frequency greater than a preselected range (or outside a preselected range) are filtered. The low-pass (or band pass) filtered signal is digitally sampled at a preselected fixed sampling rate asynchronous to the symbol rate. This digital data is resampled to derive a digital filter output having a selectable sampling rate and time position relationship to the baseband signal. The filter output is demodulated to determine the symbol stream imposed upon the transmitted analog signal.

A feature of the digital receiver is its ability to acquire a desired signal automatically when the receiver is first turned on. To achieve the initial signal acquisition, the receiver is operated as a frequency spectrum analyzer. The controllable digital resampling filter is operated at a narrow bandwidth to determine the signal strength or power at that bandwidth. The center frequency of the resampling filter is incrementally shifted across the transponder bandwidth, to develop a power spectrum of the transponder signal. The power spectrum is analyzed to determine a strong contributor, and the digital receiver is stored and locked onto that contributor.

Once a single signal-carrying band has been identified and demodulated, the receiver reads a transport layer or header of information transmitted with the symbol stream of the baseband signal in that band. The transport layer provides a menu to identify the center frequencies and bandwidths of other signals, if any, carried within the available frequency range and the information carried by those signals. The complete header is carried by all signals, so that if one signal is acquired, all signals may be found. If the receiver seeks a signal other than that to which it first locked, it can be readily retuned to the desired signal using the information in the header.

Subsequent scheduled changes in the center frequency or bandwidth are signalled by information carried in the baseband signal header. The digital receiver recognizes this information, and accordingly reconfigures the receiver to follow the scheduled transmitter changes. A seamless transition is thereby achieved.

The present invention provides an important advance in the art of digital receivers. The baseband signal is sampled at a fixed asynchronous rate, and this sampled signal is resampled by a controllable digital filter at an optimal sampling rate for the symbol transmission rate. By a symbol timing loop operating from a timing error signal, the resampling filter is time position locked to the phase of the symbol transmission of the baseband signal epoch as it changes. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
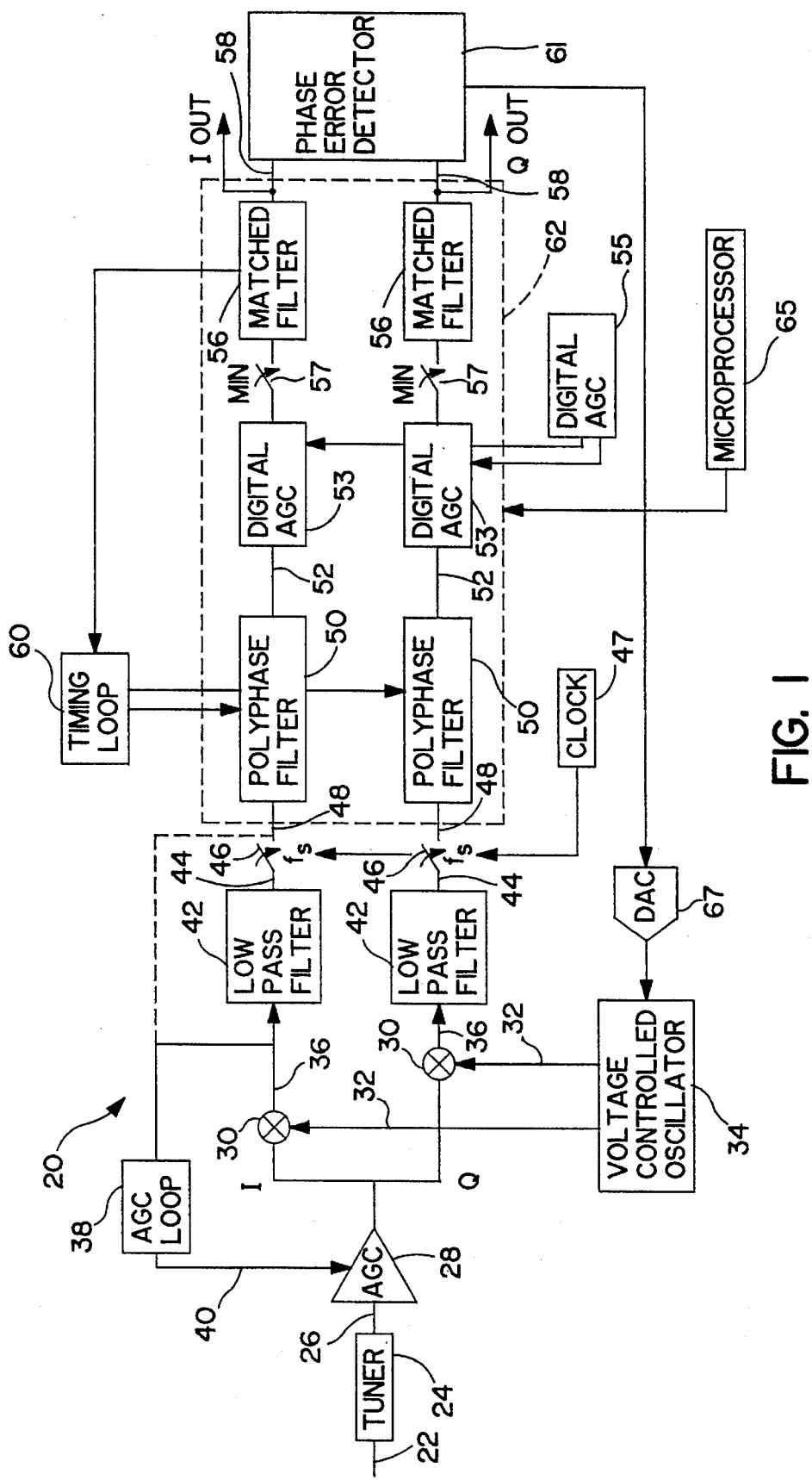
FIG. 1 is a block diagram of a receiver.

FIG. 1 is a block diagram of a digital receiver 20. A transmitted radio frequency analog signal 22 is received by a conventional tuner 24 appropriate for the band of the signal 22. A received intermediate frequency analog output signal 26 produced by the tuner 24 is amplified by a variable-gain amplifier 28 to an amplitude suitable for subsequent signal processing.

The orthogonal I/Q (in phase/out of phase) components of the received analog signal 26 are separately processed in parallel, as shown in FIG. 1. The processing is the same in each parallel path, and the following description applies to each of the paths.

After amplification by amplifier 28, the received analog signal 26 is provided to a detector/mixer 30 as a first input. A second input is an internally generated local oscillator (mixer) waveform 32 provided by a voltage-controlled oscillator 34. The output of the detector/mixer 30 is a baseband signal 36 that contains the transmitted information, in this case a stream of digital waveforms.

The baseband signal strength of one of the I/Q components of the processing path is sampled at this point by an automatic gain control loop 38. The AGC loop 98 provides a feedback amplitude control signal 40 to the variable-gain amplifier 28. The gain of the amplifier 28 is adjusted to provide the required baseband signal strength for further processing. Alternatively, the signal strength may be determined after digitizing and used in the AGC loop 38, see the dashed line leading into block 38. In that case, the AGC loop 38 will include a digital-to-analog converter.

After the detector/mixer 30, the baseband signal 36, still in analog form, is filtered by a low-pass filter 42 that acts as an anti-aliasing filter for the subsequent digital sampling and processing. The bandwidth and out-of-band attenuation of this filter 42 are selected to avoid spectral aliasing and spectral distortion of the out-of-band and in-band components, respectively, of the maximum bandwidth signal presented to the sampler. In the preferred embodiment, subsequent digital sampling is at a fixed rate of 60 MHz, and the low-pass filter 42 is therefore selected to have a maximum bandpass of 15–30 MHz, preferably 20 MHz. Symbol transmissions are therefore at a rate of no more than about 30 MHz or slightly higher per I/Q channel with this preferred embodiment. A higher sampling rate would permit a higher maximum symbol transmission rate. These values are presented by way of illustration for a preferred embodiment, but other symbol rate modes can be selected as desired. Alternatively, the filter 42 may be a band pass filter that passes a preselected band width of frequencies.

The filtered signal 44 is digitally sampled by a first sampler 46, preferably provided in the form of an analog-to-digital converter. The first sampler 46 is operated at a fixed sampling rate, asynchronous to the symbol rate of the signal, as determined from a clock 47. The sampling is asynchronous in the sense that the sampling rate is fixed and constant. There is no relation between the sampling rate and the symbol rate or frequency of the baseband signal, except that the sampling rate is sufficiently high that the conditions of the Nyquist sampling criterion are met for the highest frequency signal available to the receiver. Satisfaction of the sampling criterion is ensured by the selection of the bandpass frequency of the low-pass filter 42 in relation to the operating frequency of the first sampler 46. There may be more than two samples per symbol, when the symbol rate is less than the maximum permitted symbol rate, or less than two samples per symbol, as long as the Nyquist sampling criterion is satisfied.

This approach to the selection of the first sampler 46 is distinct from that of the art. In prior approaches, the digital sampler comparable to the sampler 46 was operated at a variable rate to satisfy the Nyquist sampling criterion for the symbol rate of the baseband signal. This approach requires multiple clocks for multiple channels, and multiple matched filters. There would be no universal clock, a significant disadvantage for a multichannel communication system.

The combination of the low-pass filter 42 and the first sampler 46 defines a maximum frequency for a particular mode of operation of the receiver 20. Different selectable sets of fixed-rate digital samplers 46 and low-pass filters 42 can be used together to achieve various modes of operation, but within any particular mode the operation of the sampler 46 remains at a fixed rate asynchronous to the symbol rate. Alternatively, a single reconfigureable fixed rate digital sampler and a single reconfigureable low-pass filter can be used to achieve various modes of operation.

Figure 2:
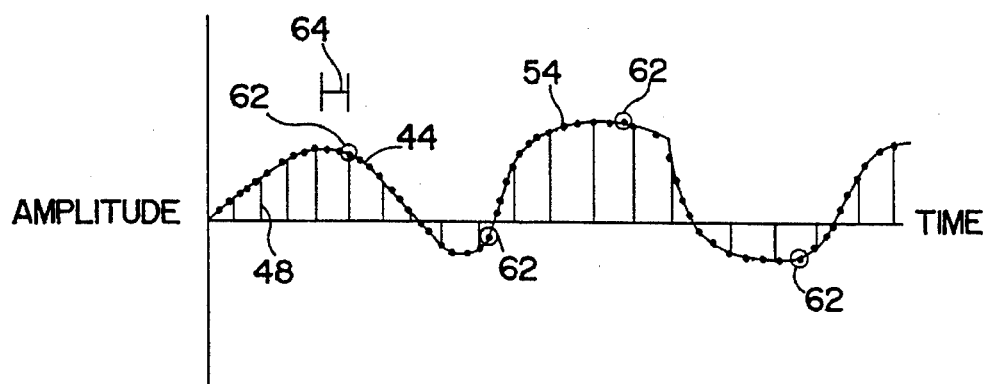
FIG. 2 is a graph of a representation of a baseband signal, with indicated sampling.

Referring again to FIG. 1, the first sampler produces a digital first sampler output 48. FIG. 2 depicts the analog baseband signal 44 in the time domain with the digital first sampler output 48 also indicated. These samples 48 do not bear any fixed, known relation to the baseband signal 44. Specifically, the asynchronous samples 48 are not taken in a particular time position relation with the symbols received or in any other relation to the symbols that is known a priori.

The first sampler output 48 is resampled by a controllable digital filter 50. The filter 50 is preferably a multirate polyphase filter capable of either rational resampling ratios utilizing interpolation and decimation according to some ratio of integers A/B, or a variable rate polyphase filter capable of a continuum of resampling ratios not restricted to simple rational ratios. The filter 50 performs two key functions. It produces an output of a controllable digital resampled signal 52 that has twice the frequency of the symbol rate of the baseband signal 36, to satisfy the Nyquist sampling criterion. Second, it ensures that the digital resampled signal 52 is time position locked to the baseband signal 36 so that the resamples are selected at the symbol locations of the signal 36.

The basic structure and operation of polyphase filters is known, see, for example, Ronald E. Crochiere et al., "Multirate Digital Signal Processing", Prentice-Hall Company, pages 59 et seq., 1983, whose disclosure is incorporated by reference. By a combination of interpolating (upsampling) and decimation (downsampling), such filters can produce a digital sampling of an input signal at any selected rate. In this case, the input is the digital first sampler signal 48. The filter 50 functions by resampling to produce the same or a lower effective sampling rate, time position locked to the timing of the digital first sampler signal 48.

As indicated in FIG. 2, the filter 50 operates by increasing the sampling rate to a higher value than that of the first sampler 46 to interpolate between the digital samples 48, producing a plurality of interpolated samples 54. The larger number of interpolated samples 54 is decimated by selecting the proper number and positions of samples to correspond to the symbol rate of the baseband signal. The ability to interpolate (i.e., upsample) as well as decimate is important in the present application, because it permits the use of resampling ratios in the range of 50–100% of the sampling rate of the sampler 46, as well as lower resampling ratios. If only decimation (downsampling) is available, this useful higher range of sampling ratios cannot be easily attained.

Figure 3:
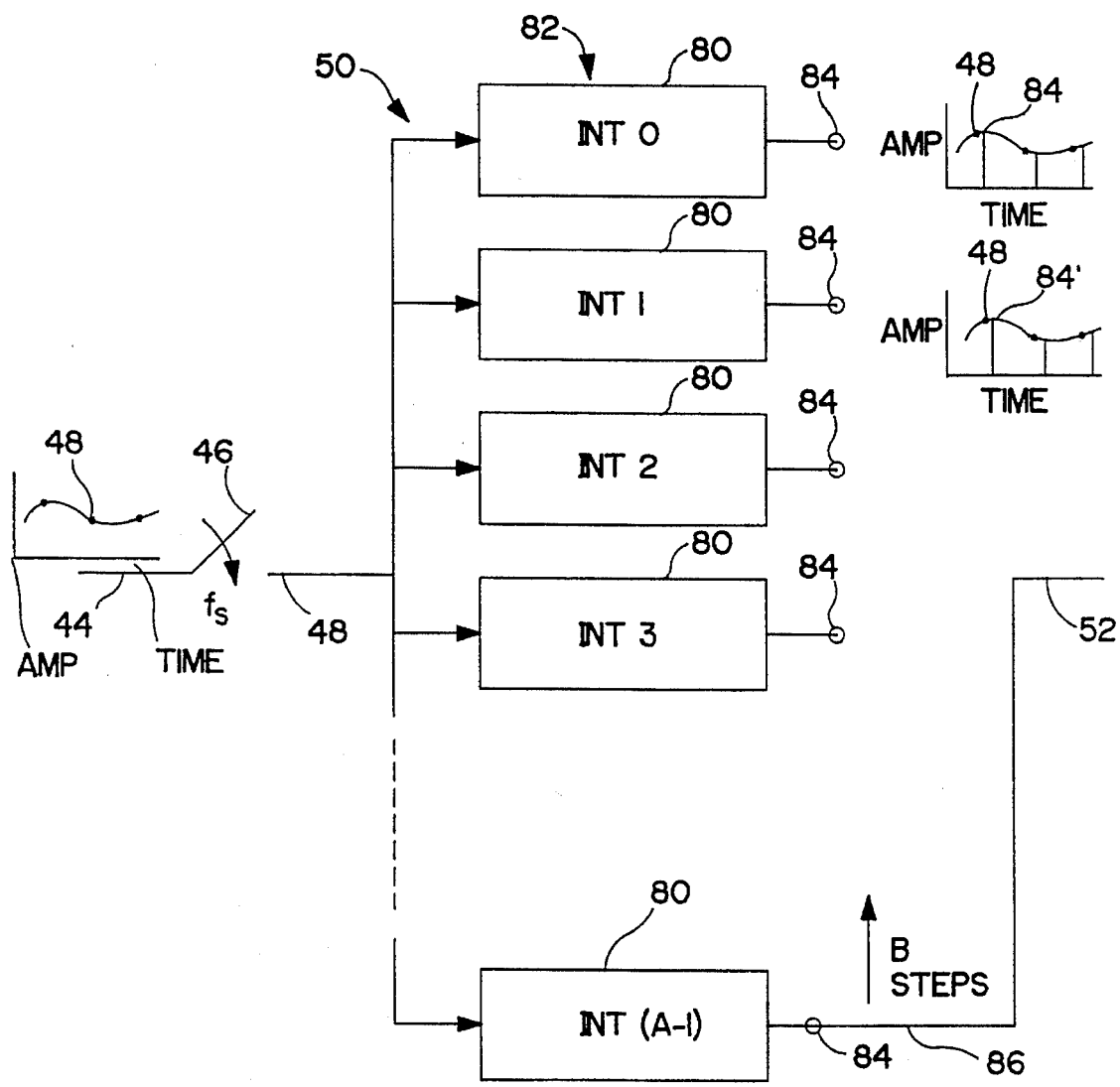
FIG. 3 is a schematic diagram of polyphase filter.

FIG. 3 schematically illustrates the operation of the polyphase filter 50. The relation of sampled and resampled signals is indicated graphically. The digital first sampler output stream 48 is supplied to each input of a plurality of A interpolators 80 of a polyphase filter bank 82. Each interpolator interpolates between the points of the output stream 48 at the same constant frequency $f_s$, the same rate as the first sampler 46, to produce its own interpolator output 84. Two of the interpolator outputs 84 and 84' are shown, for the first interpolator (INT0) and the second interpolator (INT1). The interpolator outputs 84 and 84' are at the same frequency $f_s$, but time displaced from each other. By the appropriate choice of the time displacements according to the number of interpolarors 80 in the filter bank 82, the filter bank 82 produces A upsampled interpolation points between each of the digital first sampler points 48.

A commutator 86 operates on the interpolator outputs 84 to downsample or decimate the outputs 84 by a downsampling parameter B. If the downsampling parameter B is made equal to the upsampling parameter the filter bank 82 operates as a time-shifting or phasing filter. Time increment quantization is defined by the number of polyphase filter stages, and can be made arbitrarily fine by increasing In this mode, the filter bank can align output samples from the asynchronously sampled input stream 48 to arbitrary epochs in the input symbol stream. If the frequency of the sampling clock $f_s$ used to form uniformly spaced samples and the frequency of periodic epochs $f_e$ in the underlying symbol stream differ by a small percentage, the pointer of output commutator can precess in the appropriate direction to track the epochs. Thus, rather than increment the commutator 86 in equal steps of length A, the output pointer is instead incremented in steps of A for M−1 samples and then in steps of A+/−1 at the Mth sample, according to the relation $f_s/f_e = [(M-1)A + (A+/-1)]/M$.

When the output incrementing factor B is chosen to be different from the input incrementing factor A, an output sample rate with any rational ratio multiple of the input sample rate ($f_s$A/B) can be obtained. If the desired frequency is near a rational ratio, then it can be approximated with minor phase jitter by the same precessing approach just described. For a sufficiently large A, the use of a precessing B (e.g., B') permits the formation of time matched samples at any output rate.

The digital resampled signal 52 is amplified as necessary by a digital amplifier 53 controlled by a digital automatic gain control 55. The amplified signal is resampled at the minimum permitted Nyquist rate, or more, by a resampler 57, whose output is processed by a symmetric or asymmetric matched filter 56 referenced to the transmitter waveforms and bandwidth. The matched filter 56 may be operated at a constant number of samples per symbol that is not directly a function of symbol rate. An output 58 of the matched filter 56, a spectrally shaped bit stream synchronized to the original symbol stream that generated the baseband signal, is provided to further processing hardware, which is not within the scope of the present invention.

The phase of the sampling of the controllable digital filter 50 is established in conjunction with the filter bank 82 discussed above, using a timing loop 60. The error between the reference signal of the matched filter 56 and the digital resampled signal is a measure of the time position shift required in the controllable digital filter 50 to recover the timing and align the digital samples with the symbols encoded into the baseband. Referring to FIG. 2, if the matched filter 56 indicates that the digital resampled signal points, indicated by circled points 62, are time position shifted from their respective symbol locations by an error 64, the timing loop 60 shifts the time position of the resampling of the controllable digital filter 50 by interpolating to the desired positions, thereby reducing the error The phase error of the output signal I/Q pair 58 is detected by a phase error detector 61. This phase error is provided, via a digital/analog converter 67, to the voltage controlled oscillator 34, which generates the frequency and phase-coherent mixer waveform The controllable digital filter 50 and the matched filter 56 together form a controllable signal processor 62. The filters 50 and 56 may be combined into a single filter, or may be retained in the partitioned architecture described here.

In the preferred approach, the controllable signal processor 62 is controlled in part by the timing loop 60 and in part by a microprocessor 65. The controllable signal processor 62 also provides information to the microprocessor 65. The ability to control and interact with the controllable signal processor 62, which contains the controllable digital filter 50, provides great flexibility and power to the receiver 20.

Figure 4:
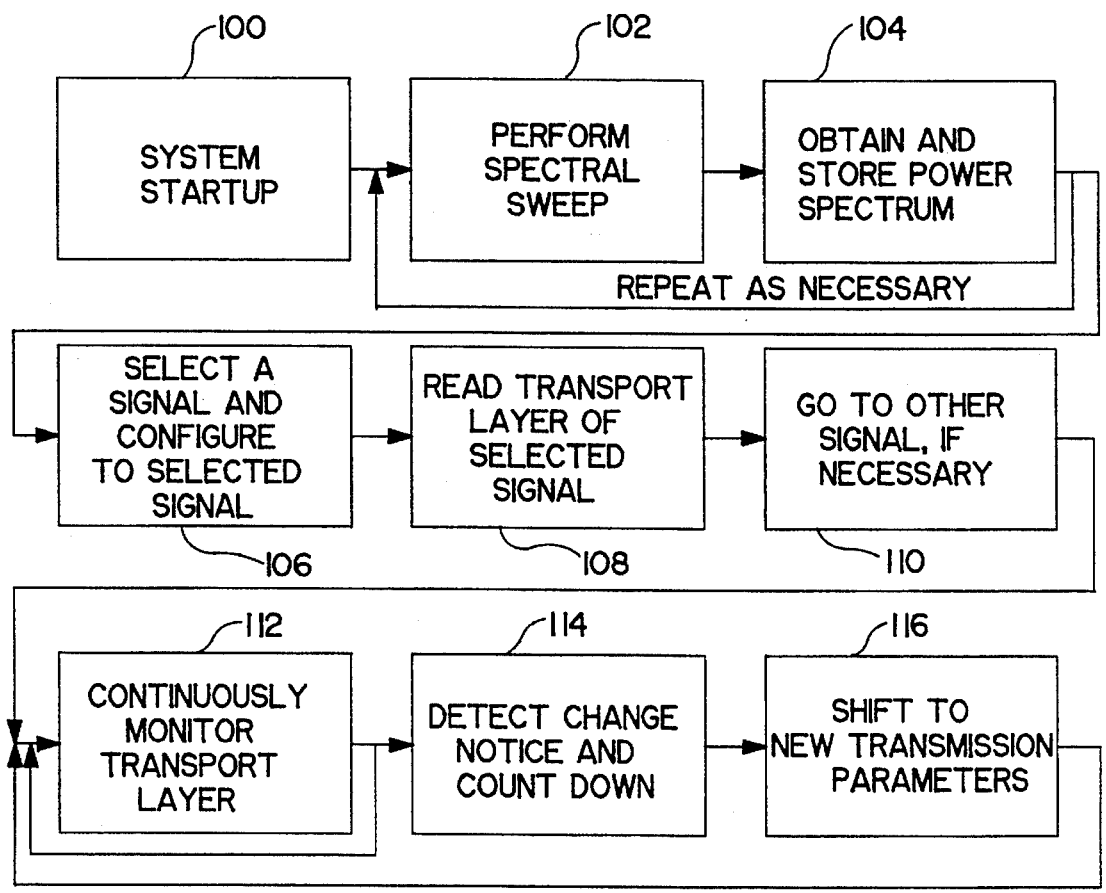
FIG. 4 is a block flow diagram for the acquisition of a signal upon startup of the system and the continuous monitoring of the signal for transmission changes during operation.

An important function of the microprocessor 65 is to support the initial signal acquisition by the receiver and to aid in making a seamless shift responsive to announced changes in the transmitted signal. FIG. 4 illustrates both of these processes, in the context of system startup and continued monitoring of the symbol stream using the preferred receiver 20. These functions may be implemented on other receivers as well.

It system startup, numeral 100, the center frequency and bandwidth of all signals must be assumed to be unknown, but within the general specifications of the hardware. By contrast, in most types of signal communications the center frequency and bandwidth of the signal are preselected and available to the receiver, so that the receiver can be configured directly to those values upon startup. The present approach permits the greatest extent of flexibility for those using the communications system with the receiver 20 of the invention.

To locate the unknown center frequency and bandwidth, the microprocessor 65 causes the controllable signal processor 62 to act as a narrow bandwidth, swept frequency spectrum analyzer. The controllable digital filter 50 is operated as a narrow bandwidth filter, typically at about 2 MHz bandwidth. The center frequency received by the controllable digital filter 50 is shifted by adjusting the voltage of the voltage controlled oscillator 34 to generate the mixer waveform 32 in a series of frequency steps which span the bandwidth available to the system. The entire available bandwidth is swept, numeral 102. The frequency step size is preferably equal to one-half the filter's bandwidth and the dwell time at each frequency position is sufficient to obtain a low variance estimate of the total signal power received at that frequency.

Figure 5:
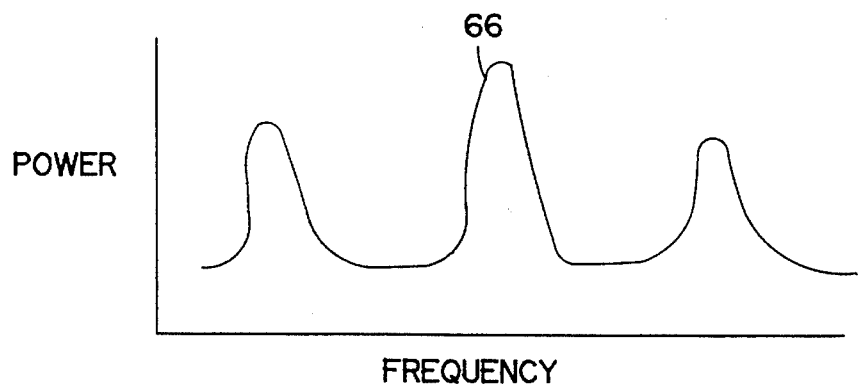
FIG. 5 is a graph of a power spectrum of the transmission channel.

At each frequency, the total power in the received baseband signal is measured, numeral 104. To determine the total power transmitted in each frequency band sample, the output of the controllable digital filter 50 is resampled to the appropriate Nyquist rate and converted to a total power estimate by summing the squares of the signal samples. The value of the power received at each frequency is stored the microprocessor. The spectral sweep 102 and power determination 104 may be repeated as many times as necessary to build a statistical base, with the results of all of the sweeps digitally averaged by a digital integrator. At the completion of the sweeps and power determination, the microprocessor 65 holds a power spectrum of the broadband of the system. This power spectrum contains one or more peaks 66 indicating the transmission of the corresponding signals available to the receiver. FIG. 5 illustrates such a power spectrum.

Figure 6:
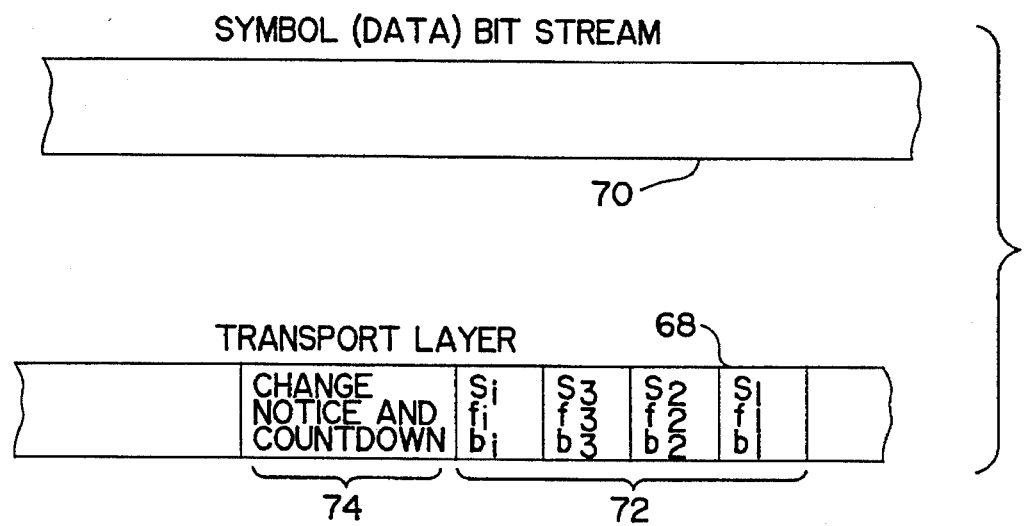
FIG. 6 is a schematic representation of a header found in the symbol stream of each signal transmitted within a channel.

The receiver 20 is tuned to the center frequency of any one of the signal peaks 66, numeral 106, preferably one of strong power indicating a clear signal available for decoding. A symbol bit stream is established by the normal processing discussed previously. As illustrated in FIG. 6, each bit stream contains a transport layer 68 (also termed a "header") of information in addition to the symbol stream 70. The symbol stream varies from signal to signal, but the transport layer 68 of each of the signals contains at least a menu 72 of all of the signals, corresponding to each of the spectral peaks in FIG. 5.

Each menu 72 of each signal contains a listing of each of the available i signals $S_i$ and their respective center frequencies $f_i$ and bandwidths $b_i$. Thus, for example, if the receiver happened to select signal $S_2$ in step 106, the menu of all signals $S_i$ is read from the transport layer 68 of signal $S_2$, numeral 108. If the microprocessor 65 determines from the menu that the signal of interest is in fact signal $S_3$, the frequency $f_3$ and bandwidth $b_3$ are read from the menu 72. The tuner and receiver are immediately reconfigured to the frequency $f_3$ and bandwidth $b_3$ to complete the startup, numeral 110.

In a typical case, it is estimated that the signal acquisition is completed in less than about 100 milliseconds from startup.

After startup, the receiver 20 is operated to respond automatically to changes in the transmission parameters of the signal in the following manner. During receipt of the symbol bit stream of a signal, the transport layer 68 is continuously monitored by the microprocessor 65, numeral 112. In the event that the service supplier that provides the signal being monitored decides to change a transmission parameter such as the center frequency, the bandwidth, the symbol frequency, or other parameter, information indicating the planned change is encoded into a change block 74 of the transport layer 68. The change block 74 typically would include the old parameters, the new parameters, and a countdown timer to, or other indicator of, the initiation of the new parameters. The microprocessor 65 counts down to the initiation of the new parameters, numeral 114, or monitors for any other initiation signal that may be used. At the time of the change to the new signal parameters, the microprocessor 65 instantaneously reconfigures the receiver to the new parameters, numeral 116. With this advance warning of the transmitting parameter change, the changeover is made in a seamless manner. Continuous monitoring of the transport layer 68 also provides information on other signals and their transmission changes, for use when the receiver is switched to a different signal. Switches and changeovers could be made instead by repeating the initiation procedures 102–110, but this would necessarily involve some loss of signal until the new signal parameters were determined.

Figure 7:
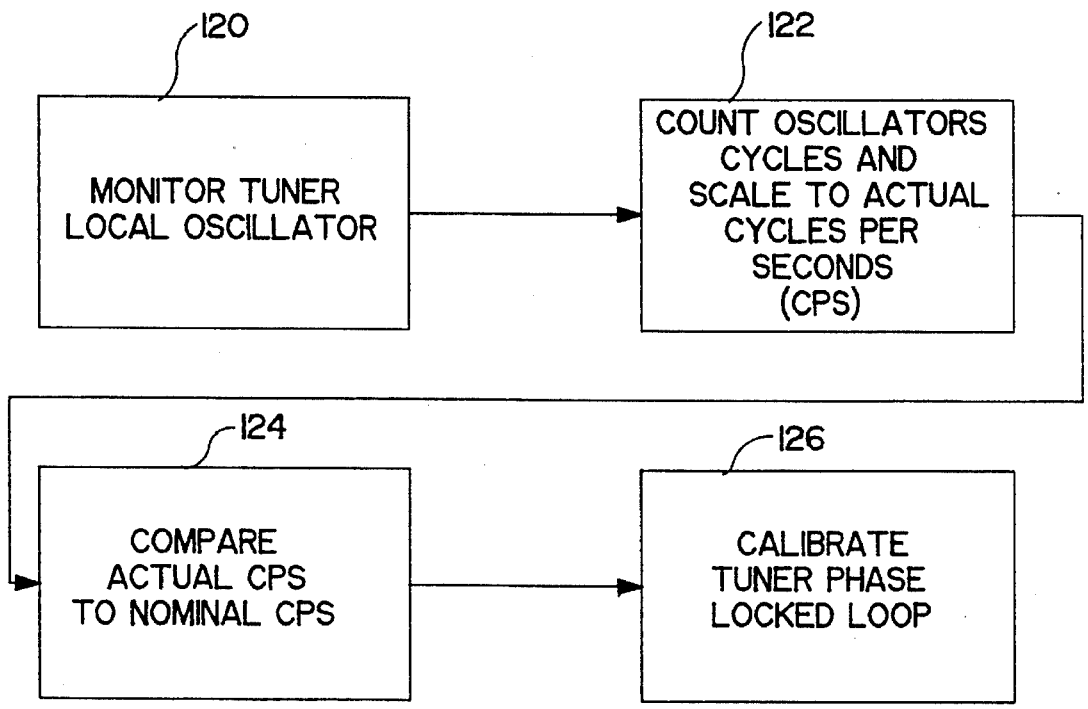
FIG. 7 is a block flow diagram of a self-compensation of the receiver for thermal drift of the local oscillator.

The intelligence provided to the receiver 20 by the microprocessor 65 also is used to advantage in performing test and calibration procedures of the receiver. As an example of the calibration function, the receiver 20 can instantaneously self-compensate for temperature changes that alter the frequency of an oscillator. As shown in FIG. 7, the microprocessor 65 monitors the frequency of the local oscillator of the tuner 24, numeral 120. The frequency is determined by counting the oscillator cycles for a fixed period of time, and converting the number of counts per interval into an actual oscillator cycles per second, numeral 122. The actual oscillator cycles per second is compared to a nominal value, numeral 124. The difference, a calibration for thermal drift or other variation of the tuner oscillator, is provided to the time position-locked loop of the tuning control, numeral 126.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A digital receiver for an analog signal wherein a symbol rate of the analog signal can be varied over a range, the digital receiver comprising:

a source of a baseband received analog signal;

a first sampler having an input of the baseband analog signal and a digital first sampler output;

a controllable digital filter having a first input of the digital first sampler output and a second input of a time-shifting command signal, and an output of a controllable digital resampled signal, said digital resampled signal including a symbol bit stream having a symbol rate;

means for determining a timing error signal of the symbol bit stream;

a timing loop having an input of the timing error signal of the symbol bit stream and an output of the time-shifting command signal to the controllable digital filter; and a clock coupled to the first sampler to operate the first sampler at a preselected fixed sampling rate asynchronous to the symbol rate.

2. The digital receiver of claim 1, wherein the source of the baseband signal comprises a tuner having the received radio frequency analog signal as an input and a received intermediate frequency analog signal as an output, a demodulator having a first input of the received intermediate frequency analog signal and a second input of a mixer waveform, and an output of the baseband signal modulated on the received analog signal, and a low pass analog filter having an input of the baseband signal and an output of a filtered baseband signal comprising the baseband analog signal.

3. The digital receiver of claim 1, wherein the source of the baseband signal comprises a tuner having the received radio frequency analog signal as an input and a received intermediate frequency analog signal as an output, a demodulator having a first input of the received intermediate frequency analog signal and a second input of a mixer waveform, and an output of the baseband signal modulated on the received analog signal, and a band pass analog filter having an input of the baseband signal and an output of a filtered baseband signal comprising the baseband analog signal.

4. The digital receiver of claim 1, further including a voltage controlled oscillator having an input of a voltage control signal and an output of the mixer waveform.

5. The digital receiver of claim 1, wherein the means for determining a timing error signal includes a matched filter having an input of the controllable digital resampled signal, and a first output of a spectrally shaped symbol bit stream and a second output of a timing error signal of the symbol bit stream.

6. The digital receiver of claim 1, further including means for identifying the bandwidth and center frequency of a transmitted analog signal at the initiation of operation.

7. The digital receiver of claim 6, wherein the means for identifying includes means for controlling the controllable digital filter to operate at a narrow bandwidth;

means for sweeping the narrow bandwidth of the controllable digital filter over a range of narrow bandwidths;

means for determining the power spectrum of the outputs of the controllable digital filter over the range of narrow bandwidths; and means for selecting a center frequency and bandwidth from the power spectrum.

8. The digital receiver of claim 1, further including a system clock that provides a clock rate to the first sampler.

9. The digital receiver of claim 1, wherein the controllable digital filter is a multirate polyphase filter.

10. The digital receiver of claim 1, wherein the controllable digital filter is a variable rate polyphase filter.

11. The digital receiver of Claim 1, wherein the controllable digital filter and the means for determining a timing error signal of the symbol bit stream are embodied as a single polyphase filter.

12. The digital receiver of claim 1, further including means for reading a header data signal of the symbol bit stream.

* * * * *